US012598432B2

(12) United States Patent
Dundas et al.

(10) Patent No.: US 12,598,432 B2
(45) Date of Patent: Apr. 7, 2026

(54) SIDE-BY-SIDE COMPARISON OF HEARING DEVICE OUTPUT BASED ON PHYSICAL COUPLING TO DEVICE UNDER SIMULATION

(71) Applicant: Earlens Corporation, Menlo Park, CA (US)

(72) Inventors: Drew Dundas, San Anselmo, CA (US); Stuart Wenzel, San Carlos, CA (US); Fletcher Dundas, San Anselmo, CA (US)

(73) Assignee: Earlens Corporation, Menlo Park, CA (US)

( * ) Notice: Subject to any disclaimer, the term of this patent is extended or adjusted under 35 U.S.C. 154(b) by 216 days.

(21) Appl. No.: 18/661,500

(22) Filed: May 10, 2024

(65) Prior Publication Data

US 2024/0381038 A1 Nov. 14, 2024

Related U.S. Application Data

(60) Provisional application No. 63/501,982, filed on May 12, 2023.

(51) Int. Cl.
*H04R 25/00* (2006.01)

(52) U.S. Cl.
CPC ......... *H04R 25/505* (2013.01); *H04R 25/356* (2013.01); *H04R 25/556* (2013.01); *H04R 25/70* (2013.01)

(58) Field of Classification Search
CPC .. H04R 25/356; H04R 25/505; H04R 25/556; H04R 25/70; H04R 25/30; H04R 25/43; H04R 25/554
USPC .......................................................... 381/312
See application file for complete search history.

(56) References Cited

FOREIGN PATENT DOCUMENTS

| | | | | |
|---|---|---|---|---|
| CN | 1260104 A * | 6/2015 | ........... | H04R 25/554 |
| WO | WO-2022041166 A1 * | 3/2022 | ........... | H04R 25/606 |

* cited by examiner

*Primary Examiner* — Phylesha Dabney
(74) *Attorney, Agent, or Firm* — Polsinelli PC

(57) ABSTRACT

An apparatus can include a first ear simulator coupler configured to receive a first hearing device within a first aperture, with an acoustic microphone provided below the first aperture to capture first audio input data associated with the first ear simulator coupler. A second ear simulator coupler can comprise a second aperture configured to receive a contact hearing device ear tip, the second ear simulator coupler including a receive coil configured to obtain a second audio input data corresponding to a transmitted signal from the contact hearing device ear tip when inserted within the second ear simulator coupler. The apparatus can include an audio output port can be connected by a switch to a selected one of a first audio processing path corresponding to a simulated hearing experience of the first hearing device, or a second audio processing path corresponding to a simulated hearing experience of the contact hearing device.

20 Claims, 8 Drawing Sheets

SIDE-BY-SIDE COMPARISON OF HEARING DEVICE OUTPUT BASED ON PHYSICAL COUPLING TO DEVICE UNDER SIMULATION

CROSS-REFERENCE TO RELATED APPLICATIONS

This application claims the benefit of U.S. Provisional Patent Application No. 63/501,982, filed May 12, 2023, which is hereby incorporated by reference, in its entirety and for all purposes.

FIELD

The present disclosure generally relates to audio signal processing. For example, aspects of the present disclosure relate to realistic simulation of acoustic hearing aid audio outputs and contact hearing device audio outputs.

BACKGROUND

Hearing aids and other hearing devices can be worn to improve hearing by making sound audible to individuals with varying types and degrees of hearing loss. In addition to amplifying environmental sound to make it more audible to a hearing-impaired (HI) user, existing hearing aids may also implement various digital signal processing (DSP) approaches and techniques in an attempt to further improve the intelligibility of the amplified sound. In particular, many hearing aids may perform DSP in an attempt to improve the intelligibility of speech for HI users.

In-canal hearing aids are a common type of hearing device used by hearing impaired individuals. In-canal hearing aids have proven successful in the marketplace due to factors such as improved comfort and/or cosmetic experience. However, many in-canal hearing aids have issues with occlusion. Occlusion is an unnatural, tunnel-like hearing effect which can be caused by hearing aids which at least partially occlude the ear canal. Occlusion can be noticeable when a hearing aid user speaks and the occlusion results in an unnatural sound of the speech. To reduce occlusion, many in-canal hearing aids have cents, channels, or other openings that allow air and sound to pass through the hearing aid (e.g., between the lateral and medial parts of the ear canal, adjacent to the hearing aid placed in the ear canal).

More generally, many hearing aids and conventional hearing devices have a limited bandwidth of audible amplification. The bandwidth of audible amplification is the bandwidth of the speech (or other target signal) that the user listens to that is actually processed and amplified by the hearing aid to a level that exceeds the user's hearing threshold. The limited audible processed bandwidth of conventional hearing aids and other hearing devices is due in large part to the physics of attempting to produce a broadband, high-level signal with a very small speaker or driver (e.g., such as those found in conventional hearing aids and other hearing devices). Hearing aids or hearing devices that are designed to also leave the ear canal largely open (e.g., to avoid the issues of occlusion noted above) can be seen to further exacerbate the challenges of attempting to produce a broadband, high-level signal.

In many cases, the various hearing aids or other hearing devices offered in a particular product line (e.g., basic, mid-range, and premium level devices, etc.) may use the same microphones, signal processing hardware and/or receivers—as such, the bandwidth of audibility (e.g., the bandwidth of audible amplification) is largely consistent or the same across different technology levels of the same product. Moreover, the bandwidth of audible amplification is typically limited by the same constraints on stable gain, low-frequency roll-off with venting, etc. Accordingly, patients that are fit with open venting or non-custom domes often receive only a fraction of their listening experience through the processing and amplification of the hearing device itself, for instance due to low-frequency contributions of the direct unamplified path and the limited high-frequency maximum output of the receiver, leaving much of the hearing device technology unheard.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for side-by-side comparison of hearing device output based on physical coupling to device under simulation. According to at least one illustrative example, an apparatus for simulating a hearing experience of one or more hearing devices is provided, the apparatus comprising: a first ear simulator coupler comprising a first aperture on an outer surface of a housing of the apparatus, wherein the first ear simulator coupler is configured to receive a first hearing device; an acoustic microphone provided within the interior of the housing below the first aperture and configured to capture first audio input data associated with the first ear simulator coupler; a second ear simulator coupler comprising a second aperture on the outer surface of the housing, wherein the second ear simulator coupler includes a receive coil configured to obtain a second audio input data corresponding to a transmitted signal from a contact hearing device inserted within the second ear simulator coupler; and an audio output port connected by a switch to a selected one of: a first audio processing path corresponding to a simulated hearing experience of the first hearing device; or a second audio processing path corresponding to a simulated hearing experience of the contact hearing device.

In some aspects, the contact hearing device comprises an ear tip including one or more microphones, an audio processor, and a transmit coil; and the receive coil of the second ear simulator coupler receives the transmitted signal from the transmit coil of the ear tip, wherein the ear tip is inserted within the second ear simulator coupler.

In some aspects, the transmitted signal encodes processed audio generated by the audio processor of the contact hearing device ear tip and using the one or more microphones; and the second audio input data comprises a received version of the transmitted signal as received by the receive coil.

In some aspects, the first hearing device comprises an acoustic hearing aid; the first ear simulator coupler is a hearing aid coupler configured to receive the acoustic hearing aid inserted within the first aperture; and the hearing aid coupler and the first aperture have resonance characteristics and an acoustic impedance based on an average or a reference human ear.

In some aspects, the first audio input data includes: amplified sound emitted by the acoustic hearing aid inserted within the first aperture, wherein the amplified sound is captured by the acoustic microphone included in the apparatus; and direct path sound captured by the acoustic microphone, where the direct path sound is not emitted by the acoustic hearing aid.

In some aspects, the apparatus further includes headphones coupled to the audio output port and worn by a listener; a first position of the switch causes the apparatus to use the audio output port to provide a first simulated audio output signal to the headphones; and a second position of the switch causes the apparatus to use the audio output port to provide a second simulated audio output signal to the headphones.

In some aspects, playback of the first simulated audio output signal by the headphones produces sound at an eardrum of the listener with a level and a frequency response configured to simulate the hearing experience of the first hearing device; and playback of the second simulated audio output signal by the headphones produces sound at the eardrum of the listener with a different level and a different frequency response configured to simulate the hearing experience of the contact hearing device.

In some aspects, the switch is provided on the outer surface of the housing and is moveable between the first position and the second position by the listener to select between the simulated hearing experience of the first hearing device and the simulated hearing experience of the contact hearing device.

In some aspects, the apparatus is configured to generate the first simulated audio output signal and the second simulated audio output signal in parallel, based on the first hearing device being inserted within the first ear simulator coupler and the contact hearing device being inserted within the second ear simulator coupler.

In some aspects, the apparatus includes one or more audio processors configured to: generate a contact hearing device simulated audio output signal, based at least in part on processing the second audio input data using a selected set of gain and compression settings to parameterize the second audio processing path, wherein the selected set of gain and compression settings corresponds to a selection from a plurality of pre-configured fitting targets for the contact hearing device; and provide the contact hearing device simulated audio output signal to a listener via headphones associated with the apparatus.

In some aspects, the plurality of pre-configured fitting targets are based on Real Ear Aided Response (REAR) information measured at an eardrum of a reference listener to match a response corresponding to placement of a contact hearing device transducer on the eardrum of the reference listener.

In some aspects, the contact hearing device simulated audio output signal is provided to the headphones based on a second position of the switch, wherein the second position of the switch couples the audio output port to an output of the second audio processing path.

In some aspects, the contact hearing device simulated audio output signal is generated based on calibration information associated with the headphones; playback of the contact hearing device simulated audio output signal by the headphones produces a Real Ear Headphone Response (REHR) at an eardrum of the listener; and the REHR simulates a Real Ear Aided Response (REAR) corresponding to the transmitted signal being received by a contact hearing device transducer when placed in contact with the eardrum of listener.

In some aspects, the apparatus provides the simulated hearing experience of the contact hearing device based on: generating the contact hearing device simulated audio output signal to cause a level and a frequency response of the REHR associated with the playback by the headphones to be the same as a respective level and a respective frequency response of the REAR associated with the contact hearing device transducer when placed in contact with the eardrum of the listener and driven based on the transmitted signal.

In some aspects, the apparatus includes one or more audio processors configured to: obtain the first audio input data based on using the acoustic microphone to capture amplified sound emitted by an acoustic hearing aid inserted within the first ear simulator coupler; generate an acoustic hearing aid simulated audio output signal, based at least in part on processing the first audio input data using the first audio processing path to remove a resonance associated with the first ear simulator coupler; and provide the acoustic hearing aid simulated audio output signal to a listener via headphones associated with the apparatus.

In some aspects, the acoustic hearing aid simulated audio output signal is provided to the headphones based on a first position of the switch, wherein the first position of the switch couples the audio output port to an output of the first audio processing path.

In some aspects, the apparatus is configured to remove the resonance associated with the first ear simulator coupler based on using the first audio processing path to apply an anti-coupler resonance curve to the first audio input data.

In some aspects, the anti-coupler resonance curve comprises an inverse curve determined based on resonance information of the first ear simulator coupler.

In some aspects, the acoustic hearing aid simulated audio output signal is generated based on calibration information associated with the headphones; playback of the acoustic hearing aid simulated audio output signal by the headphones corresponds to a Real Ear Headphone Response (REHR) at an eardrum of the listener, where the REHR simulates a Real Ear Aided Response (REAR) corresponding to the amplified sound being emitted by the acoustic hearing aid when worn in-ear by the listener.

In some aspects, the apparatus provides the simulated hearing experience of the first hearing device based on: generating the acoustic hearing aid simulated audio output signal to cause a level and a frequency response of the REHR associated with the playback by the headphones to be the same as a respective level and a respective frequency response of the REAR associated with the acoustic hearing aid when worn in-ear by the listener.

BRIEF DESCRIPTION OF THE DRAWINGS

Illustrative aspects of the present application are described in detail below with reference to the following figures.

DETAILED DESCRIPTION

Figure 1:
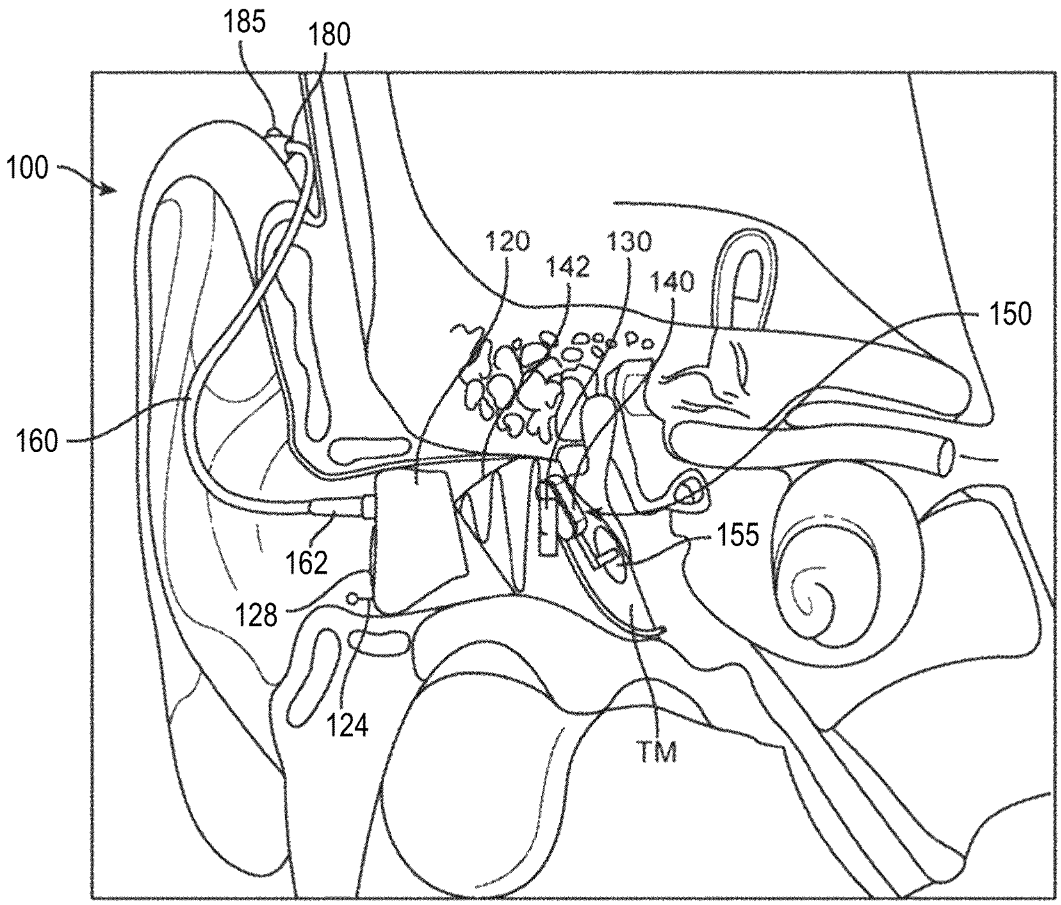
FIG. 1 is a cutaway view of an ear canal showing a contact hearing system wherein at least a portion of the contact hearing system is positioned in the ear canal, in accordance with some examples.

Certain aspects and aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides exemplary aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

In some aspects, one or more of the apparatuses described herein is, is part of, and/or includes a mobile device or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a camera, a personal computer, a laptop computer, a vehicle or a computing device or component of a vehicle, a server computer or server device, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Described herein are systems and techniques that can be used to provide users (e.g., hearing-impaired patients, users of hearing aids and/or hearing devices, etc.) with a side-by-side comparison of different hearing device outputs based on a physical coupling to each respective hearing device under simulation. In one illustrative example, the systems and techniques can be used to provide users with a side-by-side comparison between a conventional acoustic hearing aid and a contact hearing system (e.g., such as the example contact hearing system 100 that is described in greater depth below with respect to FIG. 1). It is noted that the side-by-side comparison of the realistic simulations of the contact hearing system and the conventional acoustic hearing aid is presented for purposes of illustration and example. In some embodiments, the systems and techniques can be used to implement side-by-side comparisons between a contact hearing system and various other types of hearing devices, without departing from the scope of the present disclosure. As used herein, the terms "side-by-side comparison" and "head-to-head comparison" may be used interchangeably.

In some cases, the systems and techniques described herein can be used to implement a product demonstration tool that allows patients and professionals to compare realistic simulations of a contact hearing system to a conventional acoustic hearing aid (e.g., among various other conventional hearing devices), while listening to the actual devices under reference or professional-grade headphones. As will be described in greater depth below, the systems and techniques described herein are designed to capture the full bandwidth and signal processing capabilities of each device under simulation (e.g., contact hearing system and conventional acoustic hearing aid), and to generate an acoustic signal at the eardrum that is highly similar to what is actually experienced when wearing each physical device.

In general, the systems and techniques described herein may be used to implement a hearing device simulation apparatus that can be used to provide a user or listener of the apparatus with a side-by-side comparison of different hearing device outputs based on a physical coupling between the apparatus and each respective hearing device under simulation. As used herein, the hearing device simulation apparatus can also be referred to as a "Comparator" system or apparatus, an "audio comparison" system or apparatus, and/or an "audio simulation" system or apparatus, etc. In some aspects, and as will be described in greater detail below, the Comparator apparatus can include a corresponding physical coupler for each hearing device under simulation (e.g., in the side-by-side comparison of the respective hearing device audio processing and audio output being simulated by the Comparator apparatus). For instance, the Comparator apparatus can include a first physical coupler for receiving a contact hearing system/device (or component(s) thereof) and can include a second physical coupler for receiving a conventional acoustic hearing aid (or other hearing device for head-to-head comparison against the contact hearing system). The Comparator apparatus can further include low-noise amplifiers, a source-select toggle switch, and a reference audio output device. In one illustrative example, the reference audio output device can be a pair of reference or professional-grade headphones. By inserting a contact hearing system device and a conventional hearing device (e.g., conventional acoustic hearing aid) into the appropriate Comparator apparatus couplers and donning the reference headphones, a patient or user can experience a realistic comparison of two technologies with the flip of a switch (e.g., the source-select toggle switch).

Details of the Comparator apparatus are described below with reference to FIGS. 2-6. The disclosure turns first to FIG. 1, which illustrates an example contact hearing system device that in some embodiments can be utilized with the presently disclosed Comparator apparatus (e.g., via a corresponding Comparator apparatus physical coupler for the contact hearing device).

In particular, FIG. 1 is a cutaway view of an ear canal showing an example contact hearing system 100 that may be utilized to implement aspects of the present disclosure, wherein at least a portion of the contact hearing system 100 is positioned in the ear canal. In some examples, contact hearing system 100 may also be referred to as a "smartlens system" or "smartlens". As illustrated, contact hearing system 100 can be implemented based on using electromagnetic waves to transmit information and/or power from an ear tip 120 to a contact hearing device 150.

In one illustrative example, contact hearing system 100 can be implemented based on using inductive coupling to transmit information and/or power from ear tip 120 to contact hearing device 150. The contact hearing system 100 can include one or more audio processors 180. The audio processor 180 can include or otherwise be associated with one or more microphones 185. As illustrated in the example of FIG. 1, the microphone 185 can be an external microphone (e.g., external to the ear canal and/or external to a housing of the contact hearing system 100).

Audio processor 180 may be connected to (e.g., communicatively coupled to) an ear tip 120 for providing bidirectional transmission of information-bearing signals. In some embodiments, a cable 160 is used to couple audio processor 180 and ear tip 120. The cable 160 can be used to implement the bidirectional transmission of information-bearing signals, and in some cases, may additionally or alternatively be used to provide electrical power to or from one or more components of the contact hearing system 100. In some cases, the contact hearing system 100 can perform energy harvesting to obtain power (e.g., at the contact hearing device 150 within the ear canal of the user) from the same information-bearing signals that are used to provide audio information to the contact hearing device 150.

A taper tube 162 can be used to support cable 160 at ear tip 120. Ear tip 120 may further include one or more canal microphones 124 and at least one acoustic vent 128. Ear tip 120 may be an ear tip which radiates electromagnetic (EM) waves 142 in response to signals from audio processor 180. Electromagnetic signals radiated by ear tip 120 may be received by contact hearing device 150, which may comprise receive coil 130, micro-actuator 140, and umbo platform 155.

The receive coil 130 of contact hearing device 150 can receive the EM signals radiated from ear tip 120 and, in response, generates an electrical signal corresponding to the received EM signal radiated from ear tip 120. Receive coil 130 can subsequently transfer the electrical signal to the micro-actuator 140. In particular, the electrical signal(s) at the receive coil 130 (e.g., received from/radiated by ear tip 120) can be used to drive the micro-actuator 140 to cause the user of the contact hearing system 100 to experience or perceive sound. In some embodiments, the micro-actuator 140 can be implemented as a piezoelectric actuator and/or the receive coil 130 can be implemented as a balanced armature receiver. The micro-actuator 140 (e.g., piezoelectric actuator) can convert the electrical transmission to mechanical movements and acts upon a tympanic membrane (TM) of the user. In one illustrative example, the contact hearing device 150 is positioned within an ear canal of the user such that the micro-actuator 140 is in contact with a surface of the tympanic membrane (TM) of the user. In some aspects, the micro-actuator 140 acts upon the tympanic membrane (TM) via an umbo platform 155.

In many embodiments, a device to transmit an audio signal to a user may comprise a transducer assembly comprising a mass, a piezoelectric transducer, and a support to support the mass and the piezoelectric transducer with the eardrum. For instance, the contact hearing system 100 can be implemented or configured as a device to transmit an audio signal to a user. The transducer assembly can be the same as, similar to, and/or can include the contact hearing device 150 of FIG. 1. For instance, the piezoelectric transducer mentioned above can be the same as or similar to the micro-actuator 140 of FIG. 1; and the support can be the same as or similar to the umbo platform 155 of FIG. 1.

The piezoelectric transducer (e.g., micro-actuator 140) can be configured to drive the support (e.g., umbo platform 155) and the eardrum (e.g., tympanic membrane, TM) with a first force and the mass with a second force opposite the first force. This driving of the eardrum and support with a force opposite the mass can result in more direct driving of the eardrum, and can improve coupling of the vibration of transducer to the eardrum. The transducer assembly device may comprise circuitry configured to receive wireless power and wireless transmission of an audio signal, and the circuitry can be supported with the eardrum to drive the transducer in response to the audio signal, such that vibration between the circuitry and the transducer can be decreased. The wireless signal may comprise an electromagnetic signal produced with a coil, or an electromagnetic signal comprising light energy produced with a light source. In at least some embodiments, at least one of the transducer or the mass can be positioned on the support away from the umbo of the ear when the support is coupled to the eardrum to drive the eardrum, so as to decrease motion of the transducer and decrease user perceived occlusion, for example, when the user speaks. This positioning of the transducer and/or the mass away from the umbo, for example, on the short process of the malleus, may allow a transducer with a greater mass to be used and may even amplify the motion of the transducer with the malleus. In at least some embodiments, the transducer may comprise a plurality of transducers to drive the malleus with both a hinging rotational motion and a twisting motion, which can result in more natural motion of the malleus and can improve transmission of the audio signal to the user.

Further details regarding the systems and techniques will be described with respect to the figures.

As mentioned previously, the systems and techniques described herein can be used to implement a Comparator apparatus that can provide users/listeners (e.g., hearing-impaired patients, users of hearing devices, etc.) with a side-by-side (also referred to as head-to-head) comparison of different hearing device outputs based on a physical coupling between the Comparator apparatus and each respective hearing device under simulation. For instance, the Comparator apparatus can be implemented as a product demonstration tool that allows patients and professionals to compare realistic simulations of a contact hearing system device (e.g., such as that described above with respect to FIG. 1) with a conventional acoustic hearing aid and/or other conventional hearing device. The Comparator apparatus is designed to accurately capture the bandwidth and signal processing capabilities of each hearing device under simulation/comparison, and to generate a corresponding acoustic signal for each hearing device at a user's eardrum, where the corresponding acoustic signal for each hearing device under simulation is highly similar to what is experienced when wearing the actual hearing device.

Contact hearing systems and devices such as those shown in FIG. 1 typically require a fitting process that is unique to each user. For instance, an impression of the user's ear anatomy (e.g., ear canal, etc.) may be taken and used to manufacture and custom-fit lens (e.g., contact hearing device) for that particular user. As such, true on-ear lens demonstrations may not be possible prior to being fit with the contact hearing system (e.g., taking the impression and manufacturing the custom-fit lens). Additionally, the true on-ear lens demonstration would generally require a lens placement procedure to place the lens/contact hearing device in the user's ear canal. Nevertheless, patients and providers have consistently voiced a desire to experience a live "demo" of the listening experience and benefits to be expected from a contact hearing device and system.

A contact hearing device or system (e.g., such as those of FIG. 1) can differ from conventional acoustic hearing aids in various ways. For example, one difference between a contact hearing device and a conventional acoustic hearing aid is measurable in terms of the bandwidth of audible amplification that can be achieved for a hearing impaired listener. For instance, the bandwidth of audible amplification can be understood as the frequency range of the speech or other signal that the patient listens to that is actually processed and amplified by the hearing aid to a level that exceeds their hearing threshold. Practical considerations for the fitting and adjustment of acoustic hearing aids often require that the clinician provide acoustic venting of the ear canal to mitigate perceptual problems that the listener may experience when the ear canal is sealed (e.g., when wearing the hearing aid), including a perception of one's own voice being excessively loud or abnormal in quality. While the venting is intended to decrease the amplitude of the low frequency signal in the ear canal, an unintended consequence is that the venting increases the leakage of high frequency sound from the ear canal, thereby increasing the likelihood of achieving an acoustic feedback loop. Reducing acoustic gain (e.g., of the hearing aid) decreases the likelihood of feedback, but also decreases the ability of the hearing aid to raise the amplitude of high frequency sounds above the threshold of hearing. The result is that for many hearing aid users, the hearing aid provides benefit in terms of audibility enhancement within a limited bandwidth of frequencies in the center of the normal hearing bandwidth.

Additionally, because the basic, mid-range and premium level devices from a particular product line (e.g., family of acoustic hearing aids) typically use the same microphones, signal processing hardware, and receivers, the bandwidth of audibility achieved is largely consistent across technology levels of the same product. Moreover, the bandwidth of audibility associated with conventional hearing aids and hearing devices is largely limited by the same constraints on stable gain, low frequency roll-off with venting, etc. As such, patients fit with open venting or non-custom domes often receive only a fraction of their listening experience through the processing of the hearing device itself, i.e., due to the low-frequency contributions of the direct, unamplified path and the limited high-frequency maximum output of the receiver, leaving much of the technology unheard. In other words, the processing in the amplified signal is the value that the patient is presumably paying for when upgrading from a basic or mid-range hearing aid to the latest premium-level model, but since a great deal of that processing occurs in frequency regions where the hearing aid does not provide audible output, the differences in sound quality and associated performance of different technology levels are often difficult to discern.

The limited audible processed bandwidth of conventional hearing aids is caused in large part by the physics of attempting to produce a broadband, high-level signal with a very small speaker (e.g., sized to fit within the housing of a hearing aid or other conventional hearing device) while leaving the ear canal largely open to the outside air. Larger speaker drivers are capable of providing far greater sound pressure levels, and reducing or eliminating the venting to the outside world simultaneously increases the low frequency sound pressure level in the ear canal and decreases the leakage of high frequencies from the ear canal back to the hearing aid microphone, thereby reducing the likelihood of feedback. For instance, if patients were comfortable with wearing large, occluding headphones as the output transducer of a hearing aid system, it would be much easier to achieve abroad bandwidth of audibility. However, such an approach is not practical, as a small and discreet form factor is often considered to be highly desirable when patients are comparing different hearing aids or hearing devices available to them.

In one illustrative example, an on-ear contact hearing device/system (e.g., such as that of the example of FIG. 1, described above) can bypass these limitations by eliminating the acoustic receiver unit and directly driving the middle ear system via contact with the surface of the eardrum. Directly driving the middle ear system allows production of the equivalent sound pressure level (i.e., the vibratory contact force variations equivalent to the required sound pressure at the eardrum) necessary to achieve audibility across a very broad range of frequencies for patients fitted with the on-ear contact hearing device as there is no acoustic sound produced to leak from the ear canal. Instead, the energy is transmitted directly into the middle ear system via physical contact. In other words, the direct drive approach that can be implemented by a contact hearing device in the context of the present disclosure is a major factor in enabling broadband audibility to be achieved in an ear-level device. Accordingly, it is contemplated that by replacing the direct-drive micro actuator of a contact hearing device "lens" with reference or professional-grade headphones and an appropriate amplifier, the systems and techniques described herein can achieve an accurate simulation of the on-ear contact hearing device experience without the inconvenience and cost of an impression and lens placement procedure.

In addition to providing an accurate on-ear contact hearing device experience, it would be desirable to compare the on-ear contact hearing device experience to that of the patient's own hearing aid (or to a newer/different model hearing aid) in a back-to-back fashion to confirm that the patient could appreciate the difference between the two technologies. In some aspects, by incorporating an ear simulator coupler, a toggle switch, and a volume control interface, the Comparator apparatus implemented according to the systems and techniques described herein can achieve the needed accuracy of simulation or reproduction, while simultaneously allowing audiologists, physicians, patients and companions to compare the sound of both technologies head-to-head.

Figure 2A:
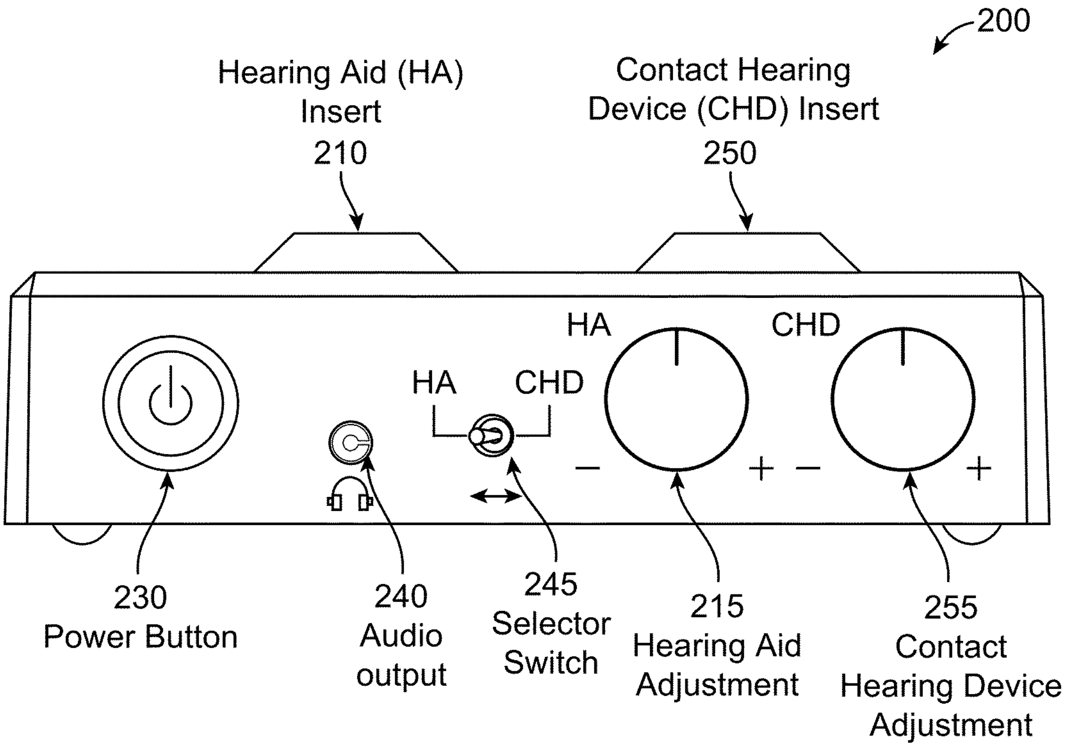
FIG. 2A is a front view of an example apparatus according to aspects of the present disclosure.
Figure 2B:
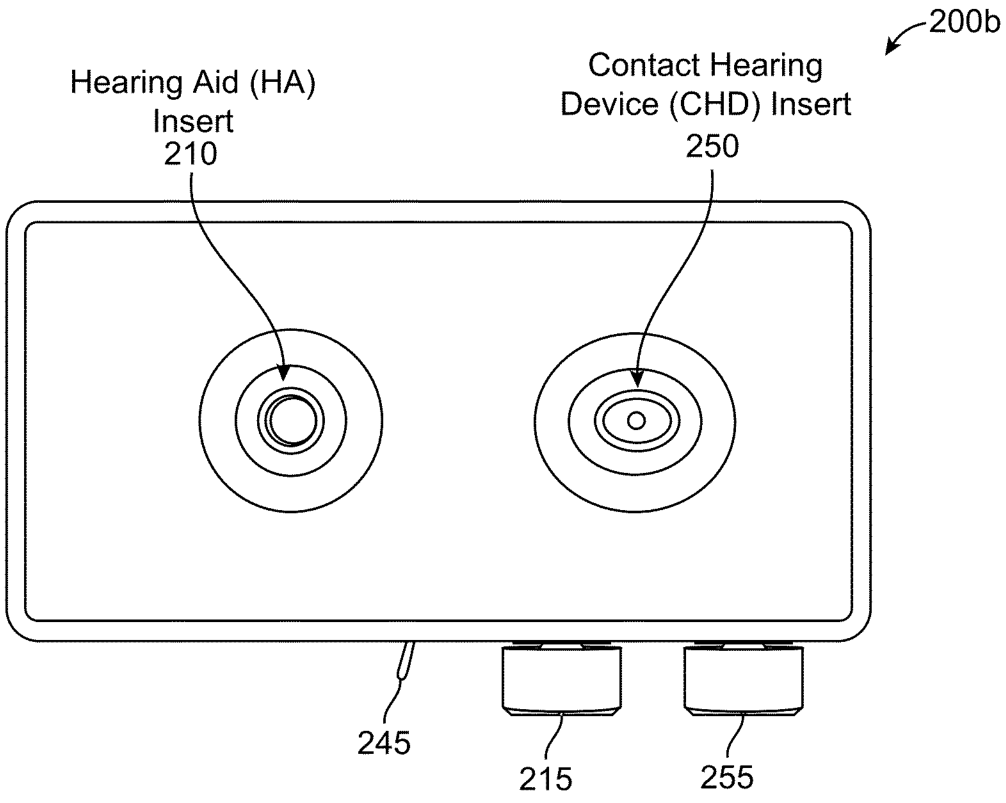
FIG. 2B is a top view of an example apparatus according to aspects of the present disclosure.

FIG. 2A is a front view of an example hearing simulation and comparison apparatus 200, according to aspects of the present disclosure. FIG. 2B is a top view of an example hearing simulation and comparison apparatus 200*b*, according to aspects of the present disclosure. In one illustrative example, the apparatus 200 of FIG. 2A can be the same as the apparatus 200*b* of FIG. 2B (e.g., FIGS. 2A and 2B present different views of the same hearing simulation and comparison apparatus 200). As noted previously, in some embodiments the example apparatus 200 may also be referred to as a "Comparator" apparatus or system, and/or may be referred to as an "audio comparison" system or apparatus, and/or an "audio simulation" system or apparatus, etc.

As illustrated, the comparator apparatus 200 can include a hearing aid simulation portion and a contact hearing device simulation portion. In particular, the comparator apparatus 200 can be split into a hearing aid "side" and a contact hearing device "side," shown in FIGS. 2A and 2B as a hearing aid (HA) insert 210 side and a contact hearing device (CHD) insert 250 side. The HA side corresponding to the hearing aid insert 210 may also be referred to as an "acoustic side" of the Comparator apparatus 200, and can be used to perform audio processing and input/output operations corresponding to simulation of an acoustic hearing aid or other acoustic hearing device. The CHD side of the Comparator apparatus 200 includes the CHD insert 250, and can be used to perform audio processing and input/output operations corresponding to simulation of a contact hearing device. In some embodiments, the portion of the Comparator apparatus 200 and components thereof used to implement the acoustic processing side for the HA insert 210 can be separate and distinct from the portion of the Comparator apparatus 200 and respective components thereof used to implement the contact hearing device processing side for the CHD insert 250. In some embodiments, one or more audio processing components and/or audio processing operations of the Comparator apparatus 200 can be shared between the acoustic processing side associated with the HA insert 210 and the contact hearing device processing side associated with the CHD insert 250.

In one illustrative example, the hearing aid insert 210 and the contact hearing device (CHD) insert 250 can be provided as physical couplers for connecting the comparator apparatus 200 to a respective hearing aid or contact hearing device. For instance, on the contact hearing device insert 250 side, a "lens" (i.e., the receive coil and the associated circuitry of the lens transducer) is located directly under the molded coupler that is disposed on the outer surface of comparator apparatus 250. In some embodiments, the contact hearing device insert 250 can include or be associated with a "lens" that is the same as or similar to the contact hearing device 150 of FIG. 1. In some aspects, the contact hearing device insert 250 can include or otherwise be associated with a lens comprising a receive coil that is the same as or similar to the receive coil 130 of FIG. 1 and/or a lens transducer that is the same as or similar to the micro-actuator 140 of FIG. 1.

The contact hearing device insert 250 can be configured to accommodate (e.g., couple to or otherwise receive) a contact hearing device ear tip with an attached or otherwise associated Comparator processor for implementing audio signal processing operations for, thereby allowing a patient to experience live sound in the surrounding environment (e.g., a voice talking, music playing in the same room as the apparatus 200, etc.) that is picked up by a microphone included in or associated with the attached Comparator processor of the ear tip.

In one illustrative example, the Comparator apparatus 200 can include, beneath the contact hearing device insert coupler 250, a "lens" that is electrically the same as or similar to the contact hearing device 150 of FIG. 1. The contact hearing device insert coupler 250 can be a physical coupler for receiving an ear tip that is the same as or similar to the ear tip 120 of FIG. 1 (e.g., the associated Comparator processor for the contact hearing device ear tip and/or the CHD insert coupler 250) can be the same as or similar to the one or more audio processors 180 of FIG. 1 and/or the microphone can be the same as or similar to the one or more microphones 185 of FIG. 1). The combination of the "lens" included in the Comparator apparatus 200 below the CHD insert coupler 250, and the ear tip inserted into the CHD insert coupler 250 can form a contact hearing system that is the same as or similar to the contact hearing system 100 of FIG. 1. Accordingly, the combination of the internal "lens" of the Comparator apparatus 200 and the inserted ear tip at or within the CHD insert coupler 250 can be used to capture ambient or surrounding audio and process the captured audio using a simulated contact hearing system.

In some embodiments, the contact hearing device (CHD) insert 250 can be configured to accommodate (e.g., receive or couple to, etc.) a non-customized demonstration ear tip with an attached Comparator processor. Audio data captured by the one or more microphones associated with the attached Comparator processor and/or otherwise included in the ear tip can be amplified and processed by the Comparator processor. The amplified and processed signal can then be emitted as an encoded signal by the ear tip. For instance, while inserted into the CHD insert coupler 250, the ear tip can emit an encoded signal that is indicative of the amplified and processed signal generated by the attached Comparator processor. For instance, the attached Comparator processor can be provided as a processor (or processor unit) that is communicatively coupled to the ear tip. The attached Comparator processor can be provided in a housing that is separate from the ear tip. For example, the attached Comparator processor of the ear tip can be the same as or similar to the audio processor 180 that is shown in FIG. 1 as being connected (e.g., communicatively coupled) to the ear tip 120 by an information-bearing cable 160. In one illustrative example, the Comparator processor that is attached to or otherwise associated with ear tip described herein can include one or more pre-defined programs for audio playback using the Comparator apparatus 200. For instance, each pre-defined program stored on and/or implemented using the attached Comparator processor of the ear tip can corresponding to a different audiogram profile. In some embodiments, the Comparator processor attached to the ear tip can store four different programs, corresponding to four common audiogram profiles. As will be described in greater depth below, when using the Comparator apparatus 200, an appropriate memory (e.g., an appropriate pre-defined program of the Comparator processor attached to the ear tip) can be selected based on a best match to the patient's hearing loss.

In some aspects, the encoded signal emitted by the ear tip coupled to the contact hearing device (CHD) insert coupler 250 can be emitted (e.g., transmitted) based on using inductive coupling between the ear tip and the receive coil of the "lens" included in the Comparator apparatus 200 and disposed below the CHD insert coupler 250. For instance, the ear tip coupled to the CHD insert coupler 250 can radiate electromagnetic (EM) or radio frequency (RF) waves in response to signals from the attached Comparator processor.

The radiated EM or RF waves comprise the encoded signal indicative of the amplified and processed audio data generated by the Comparator processor of the ear tip. The radiated EM or RF waves are received by the receive coil of the "lens" included in Comparator apparatus 200, and subsequently are used to drive a pair of reference or professional-grade headphones to emit the received audio information into the patient's ear as an acoustic signal. In some embodiments, the output audio signal(s) of the Comparator apparatus 200 can be provided via an audio output port 240. For instance, the reference or professional-grade headphones can be coupled to the audio output port 240 of Comparator apparatus 200.

Notably, because the entire bandwidth of the audio data captured by the microphone(s) of the ear tip inserted in the contact hearing device (CHD) insert coupler 250 is processed and heard through the contact hearing system, the audio output 240 of Comparator apparatus 200 provides a realistic and accurate demonstration of the listening experience of the contact hearing device. In some embodiments, the audio signal that is output by the Comparator apparatus 200 (e.g., via audio output port 240) can be a mono audio signal. In some examples, the respective audio signals that are output by the Comparator apparatus 200 for the CHD insert 250 and the acoustic hearing aid insert 210 may both be mono audio signals, with one processor sending audio to both ears (e.g., L and R channels of the reference or professional-grade headphones coupled to audio output port 240) to maximize usability and minimize complexity.

With respect to the hearing aid insert coupler 210 (also referred to as the acoustic side and/or acoustic hearing aid side of Comparator apparatus 200), the hearing aid insert coupler 210 can be implemented to have similar dimensions, resonance characteristics, and acoustic impedance as a typical or average human ear. The Comparator apparatus 200 can include one or more microphones provided underneath a protective foam mesh located at the bottom of the acoustic coupler 210 (e.g., as seen in the top-down view presented in FIG. 2B). The one or more microphones provided at the bottom of the acoustic coupler 210 can be used to capture the audio output of an acoustic hearing aid (or other hearing device) that is inserted into the hearing aid insert coupler 210. In some embodiments, the hearing aid insert coupler 210 can be designed to allow a patient to insert any hearing aid or other hearing device as if the hearing aid insert coupler 210 were the patient's own ear canal. The combination of the hearing aid insert coupler 210 and the one or more microphones provided at the bottom of the hearing aid insert coupler 210 can be used to capture both the direct path sound that would normally enter the ear canal through a vent or past a non-custom dome of the hearing aid, as well as the amplified sound emitted from the hearing aid receiver.

In some embodiments, both the hearing aid insert coupler 210 and the contact hearing device insert coupler 250 may constantly generate audio signals (e.g., based on a hearing aid being inserted in the hearing aid insert coupler 210 and a contact hearing system ear tip being inserted in the contact hearing device (CHD) insert coupler 250). As both couplers may constantly generate audio signals within Comparator apparatus 200, the Comparator apparatus 200 can include a selector switch 245 (also referred to as a toggle switch) that allows the user to toggle back and forth between the audio output port 240 providing the acoustic hearing aid output from hearing aid insert coupler 210 and providing the contact hearing system output from CHD insert coupler 250. In this manner, the user of the reference or professional-grade headphones connected to the Comparator apparatus 200 via the audio output port 240 can experience the same live sound in the environment, as processed by the hearing aid and the contact hearing system, as a head-to-head or back-to-back comparison.

With reference to the acoustic hearing aid side of the Comparator apparatus 200, once the acoustic hearing aid has been inserted into the hearing aid insert coupler 210, the Comparator apparatus 200 is configured to generate a corresponding acoustic hearing aid simulated audio output that is intended to sound virtually identical (e.g., under the reference headphones provided and coupled to the audio output port 240) to the listening experience of wearing the acoustic hearing aid in the ear. The listening experience of wearing the acoustic hearing aid in the ear can be characterized by or characterized as the Real Ear Aided Response (REAR). The REAR is a measurement that can be used to characterize the performance and/or quality of fitting of a hearing device when worn by a user.

For example, a REAR can correspond to a particular hearing device (e.g., hearing aid, headphone, etc.) and a particular hearing anatomy (e.g., ear anatomy and/or ear canal acoustic characteristics, etc.) of either an actual listener or a reference listener. In some examples, the REAR can be obtained as a measurement of the sound pressure level (SPL) at the ear drum or ear canal when a hearing aid is worn an activated. The REAR can account for the listener's unique ear canal acoustics, hearing aid settings, the coupling of the hearing aid to the ear, etc. The SPL measurements included within or otherwise indicated by the REAR can be used to determine the amount of amplification provided by the hearing aid at various different frequencies of sound. For example, the actual amplification level delivered to the eardrum at various frequencies by a hearing aid or other hearing device can be different from a configured or expected amplification level.

Achieving an audio output at the reference headphones attached to Comparator apparatus 200 that results in a signal at the listener's eardrum that is virtually identical to (or otherwise highly similar to) the REAR of wearing the acoustic hearing aid can be accomplished by including the direct path of ambient sound with the amplified sound of the acoustic hearing aid when inserted into the coupler 210, just as it would be when wearing the hearing aid in the ear, and subsequently subtracting or otherwise removing the coupler 210 resonance from the signal prior to presenting it from the headphone. For instance, the output signal from the hearing aid insert coupler 210 can include the direct path of ambient sound and the amplified sound of the acoustic hearing aid inserted in the coupler 210. Prior to being output at the audio output port 240, the Comparator apparatus 240 can perform signal processing to subtract or otherwise remove the coupler resonance of coupler 210 from the signal.

Removing the coupler resonance of acoustic hearing coupler 210 from the audio output signal of the Comparator apparatus 200 allows the individual listener's ear canal resonance to be incorporated into the signal delivered to the eardrum. In some aspects, similar to the Real-Ear Coupler Difference (RECD) approach to fitting hearing aids for children, the Comparator apparatus 200 can implement coupler resonance removal in two steps. First, the coupler microphone response (e.g., in some cases, a low-noise MEMs microphone response) is carefully calibrated during manufacturing so that the signal level generated by the microphone provided at the bottom of hearing aid insert coupler 210 falls within a narrow range of specifications, thereby ensuring that the correct overall signal level moves through the circuitry of Comparator apparatus 200.

Figure 3:
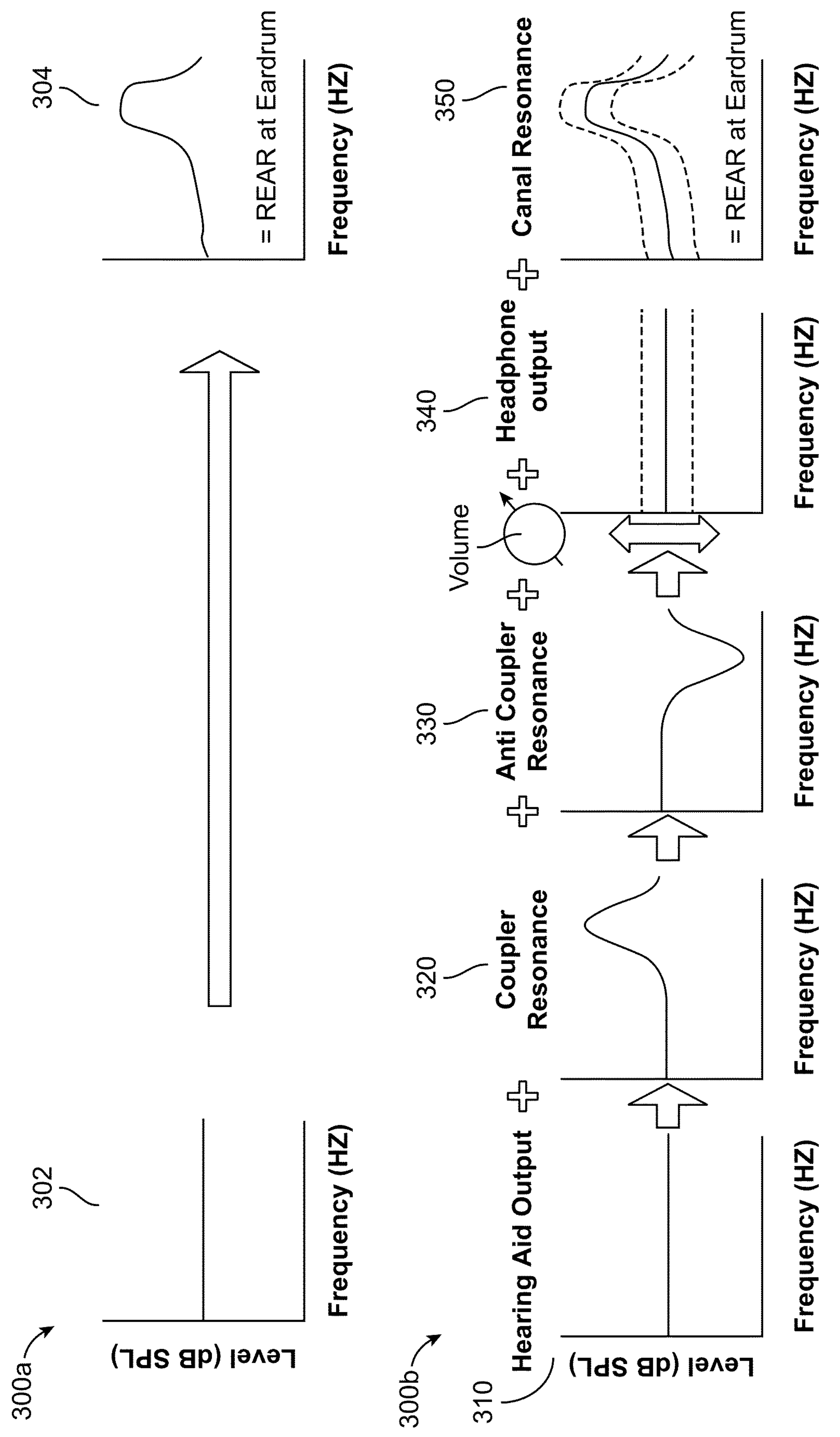
FIG. 3 is a graph depicting an example signal processing path for simulation of an acoustic hearing device, in accordance with some examples.

Second, the frequency response curve of the coupler resonance (e.g., the frequency response curve of the resonance of hearing aid insert coupler 210) is removed from the signal prior to the signal being sent to the reference headphones via audio output port 240. In other words, the resonance of the coupler 210 is removed from the signal that was captured by the microphone provided at the bottom of the hearing aid insert coupler 210. As depicted in graph 300 of FIG. 3, removing the coupler resonance allows a signal to be presented at the opening of the ear canal (under headphones) that does not contain the resonant peak of the coupler (e.g., such as the peak seen in the frequency response curve 320 of the coupler resonance, as depicted in FIG. 3). By selecting the correct level to present the signal, with the coupler resonance removed, at the opening of the ear canal under headphones, the resonant peak of the listener's ear canal is automatically added back as the signal propagates through the ear canal and to the eardrum. Accordingly, the signal as measured at the eardrum will have the correct frequency shaping and overall level.

The upper portion 300*a* of FIG. 3 depicts the hearing response when the hearing aid is worn directly in the listener's ear canal (e.g., the hearing aid signal 302 is provided to the listener's eardrum and results in the REAR at eardrum as depicted in graph 304). The lower portion 300*b* of FIG. 3 depicts a series of graphs representing the idealized signal path for the acoustic side of the Comparator apparatus 200 which can be used to simulate, for a listener under headphones, the auditory experience of the listener physically wearing the hearing aid (e.g., the lower portion 300*b* corresponds to the Comparator apparatus 200 signal processing path for providing the listener under headphones a simulated REAR 350 that matches or corresponds to the actual REAR 304 of physically wearing the hearing aid).

For example, the signal generated by the hearing aid coupled to the acoustic hearing aid coupler 210 of the Comparator apparatus 200 can be captured at the coupler 210 microphone. Accordingly, the input to the Comparator apparatus 200 for simulating the REAR of the hearing aid can be the hearing aid output signal 310 obtained from the microphone within the acoustic hearing aid insert coupler 210. More particularly, the hearing aid signal from the coupler microphone comprises the hearing aid output 310 (e.g., which is the same as the hearing aid output 302) combined with the coupler resonance 320. In other words, capturing the hearing aid signal with the coupler microphone incorporates the coupler resonance 320 to the signal.

Subsequently, circuitry within Comparator apparatus 200 is configured to apply the inverse curve 330 of the coupler resonance 320. The inverse curve of the coupler resonance 320 can also be referred to as the "anti-coupler resonance 330". The anti-coupler resonance information 330 can be pre-determined, pre-configured, or otherwise stored in a memory and/or corresponding audio processing circuitry implemented by the Comparator apparatus 200. For example, when the coupler resonance 320 is known or can be determined/estimated in advance, the corresponding anti-coupler resonance 330 can also be known or otherwise determined/estimated in advance, and accordingly can be pre-configured within the Comparator apparatus 200. By applying the inverse curve 330 of the coupler resonance 320, the two curves cancel out and restore the hearing aid output 310 without the coupler resonance effects or impacts.

The signal after applying the anti-coupler resonance 330 can be provided as the headphone output signal 340 at audio output port 240 of Comparator apparatus 200, producing a signal under the reference headphones at the opening to the listener's ear canal that can then propagate through the listener's ear canal to thereby incorporate the individual canal resonance specific to that listener—thereby producing the Real Ear Headphone Response (REHR) at the eardrum. The headphone output signal 340 can be adjusted up or down in level (e.g., amplitude/loudness/etc.) via a volume control, such as the hearing aid adjustment control 255 provided on Comparator apparatus 200 and depicted in FIGS. 2A and 2B. In one illustrative example, the anti-coupler resonance 330 applied by circuitry within Comparator apparatus 200 can, in combination with the reference or professional-grade headphones coupled to the Comparator apparatus 200, produce a REHR at the eardrum while wearing the headphones that is virtually identical to the REAR at the eardrum when the hearing aid is physically worn in the ear canal.

In some aspects, the audio processing step(s) implemented by the Comparator apparatus to remove the coupler resonance 320 by applying the anti-coupler resonance 330 can be performed so that the resonance of the hearing aid insert coupler 210 is not added to the natural resonance of the listener's ear. For instance, if the resonance of hearing aid insert coupler 210 were to be added to the natural resonance of the listener's ear (e.g., if the removal step that applies anti-coupler resonance 330 were to be omitted), this would artificially elevate the response in the 1500-3000 Hz frequency range by as much as 20 dB. The result of the signal processing performed by Comparator apparatus 200 is that the level and frequency response achieved with the hearing aid in the ear canal (REAR 304) is replicated in the user's ear when listening under the specified headphones (REHR 350) with the volume dial (contact hearing device adjustment 255) set to the vertical position (50%). Variability in the physical size and length of different listeners' ear canals results in small differences in level that can be accounted for by the range of adjustability of the volume control provided by the contact hearing device adjustment dial 255 (+6 dB and −10 dB).

The Real Ear Aided Response (REAR) of various acoustic hearing aids has been shown via probe microphone measurements performed for test users to closely match the Real Ear Headphone Response (REHR) achieved by the Comparator apparatus 200 (e.g., achieved when the Comparator apparatus 200 is used to simulate for a listener under headphones the auditory experience of the listener physically wearing the acoustic hearing aid within the ear canal, based on inserting the acoustic hearing aid within the hearing aid coupler insert 210 provided on the Comparator apparatus 200). A sample measurement 400 is presented in FIG. 4, which is a diagram depicting an example of Real Ear Aided Response (REAR) of an acoustic hearing device and Real Ear Headphone Response (REHR) of a physically simulated output of the acoustic hearing device as provided by the presently disclosed Comparator apparatus 200, in accordance with some examples.

Figure 4:
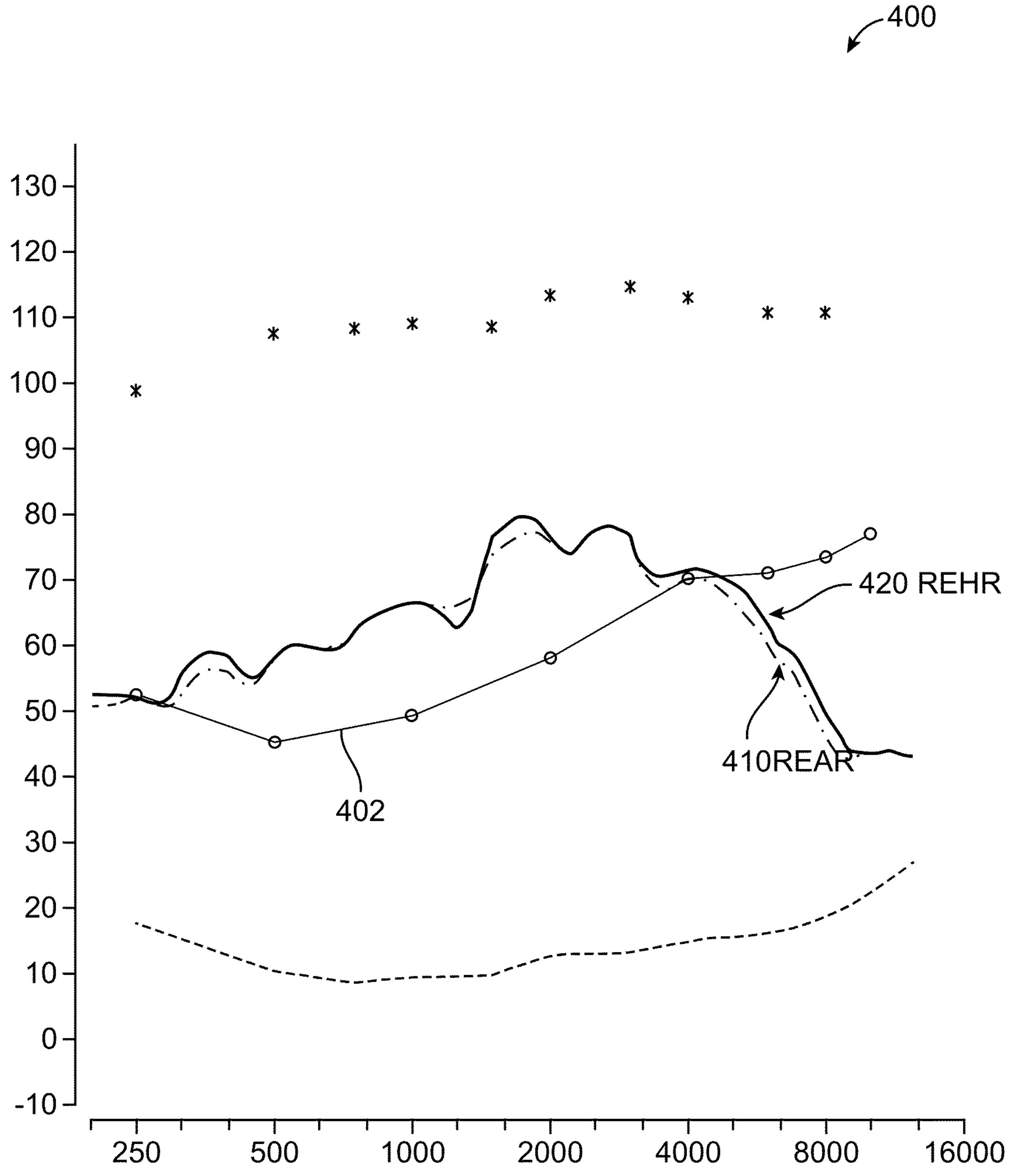
FIG. 4 is a diagram depicting an example of Real Ear Aided Response (REAR) of an acoustic hearing device and Real Ear Headphone Response (REHR) of a physically simulated output of the acoustic hearing device, in accordance with some examples.

In particular, FIG. 4 presents a graph 400 of frequency (e.g., on the horizontal x-axis, in units of Hz) vs. level (e.g., on the vertical y-axis, in units of SPL) for a measured REAR 410 and a REHR 420, captured using the same probe microphone in the ear canal. In particular, the REAR curve 410 is depicted as a dashed line representing the Real Ear Aided Response (REAR) level as a function of frequency, in response to a moderate level, speech-like signal, for a test listener wearing a RIC style hearing aid fit for a mild sloping to moderate sensorineural hearing loss. The sensorineural hearing loss used for fitting of the hearing aid associated with the REAR 410 measurements is shown as the curve 402, comprising open circles connected by a solid line.

The REHR curve 420 corresponds to simulation of the auditory experience of wearing the same hearing aid, for example with the simulation provided by the Comparator apparatus 200 of FIGS. 2A-B and/or the audio processing operations described above with respect to FIG. 3. In particular, the curve 420 represents the Real Ear Headphone Response (REHR) captured with the same probe microphone in the ear canal as was used for the REAR 410 capture, but with the hearing aid inserted into the acoustic coupler 210 of the Comparator apparatus 200, and with the reference headphones placed on the listener's ears.

In one illustrative example, the presently disclosed systems and techniques for implementing the Comparator apparatus 200 can additionally be used to provide a Real Ear Aided Response (REAR) under headphones (e.g., a Real Ear Headphone Responses (REHR)) that simulates the output characteristics of the contact hearing system associated with the contact hearing device insert coupler 250, and that substantially matches the response that would be achieved with a contact hearing system lens transducer physically placed on the listener's ear. In other words, the Comparator 200 is configured to provide a REAR under headphones (i.e., a REHR) that simulates or substantially matches the response achieved with the contact hearing device 150 and/or the micro-actuator 140 of FIG. 1 being physically placed on the listener's ear.

To achieve an accurate simulation under headphones of the contact hearing device 150 being physically placed on the listener's ear, a contact hearing device calibration process (e.g., a calibration process associated with or otherwise compatible with the example contact hearing device of FIG. 1, etc.) was used to establish the Real Ear calibration for a typical ear. For instance, in one example, the calibration process can be performed based on a listener with a known audiogram and a Real Ear Unaided Response (REUR) similar to the average canal response completing the calibration process while listening to calibration tones presented at octave frequencies from 250 Hz through 8 kHz plus 10 kHz through the Comparator apparatus 200 and under headphones, with the volume control 255 set to the reference 50% position. The relationship between the thresholds of hearing at these frequencies (as measured in routine audiometric testing) and the thresholds of hearing as measured under the supplied headphones while utilizing the contact hearing device processor (e.g., the audio processor 180 associated with the contact hearing device and ear tip 120 shown in FIG. 1), ear tip and comparator apparatus 200 as the signal generator, is utilized to establish the real ear output transfer function for the comparator apparatus 200 such that the REHR matches the targeted REAR in dB SPL.

Once output calibration is established as described above, a probe microphone is placed in the listener's ear canal under the headphones, and clinical fitting software is used to set the gain and compression settings appropriately to achieve a set of configured or prescriptive targets. A match to REAR targets for each of the four hearing losses was verified across the frequency range from below 250 Hz to 10 kHz using a real ear measurement system. In some aspects, the configured set of prescriptive targets can be based on the Categorical Auditory Model for Hearing Aids Fitting (CAM2HF) formula.

Figure 5A:
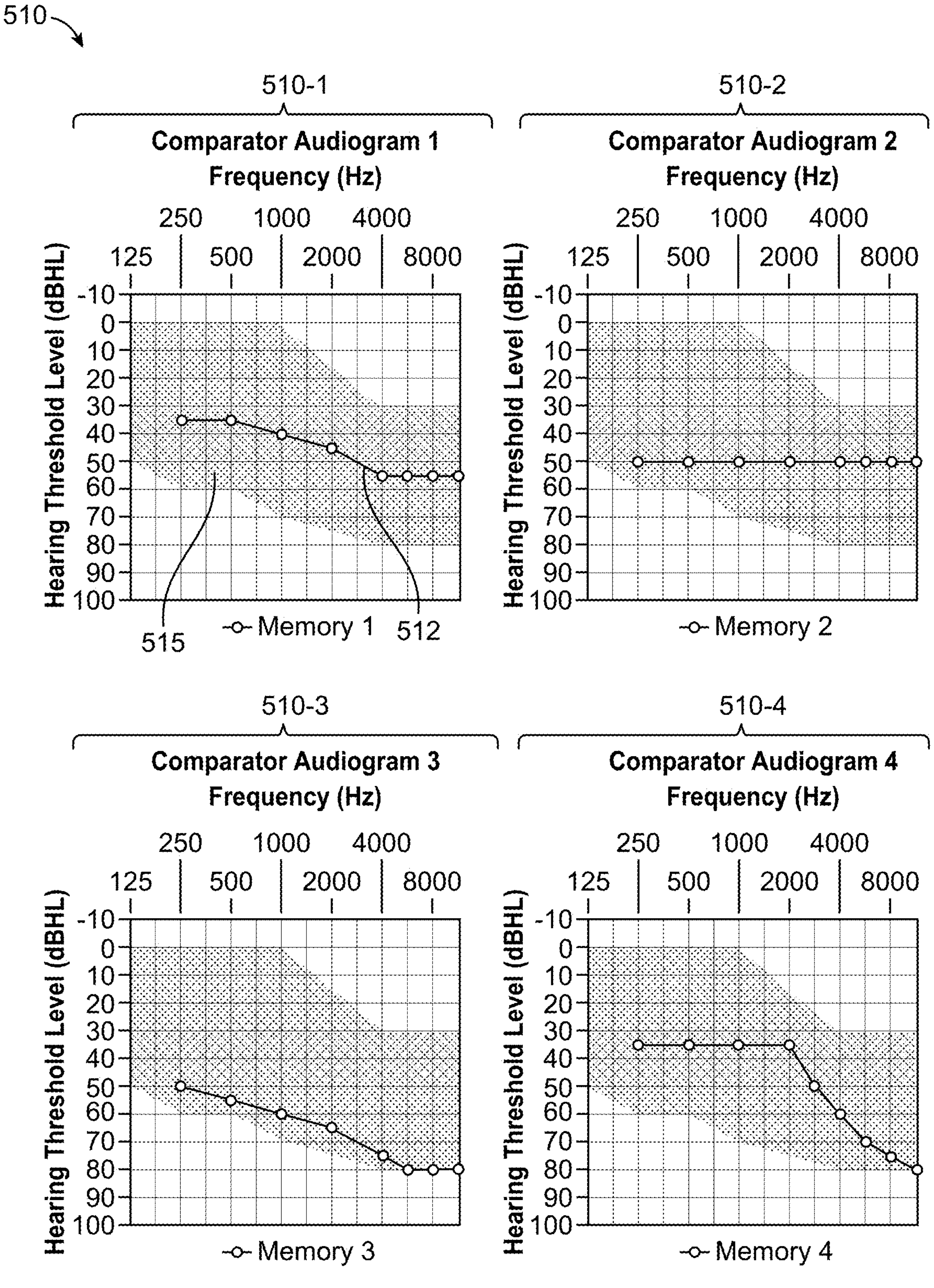
FIG. 5A illustrates a set of graphs depicting example audiometric threshold profiles, in accordance with some examples.
Figure 5B:
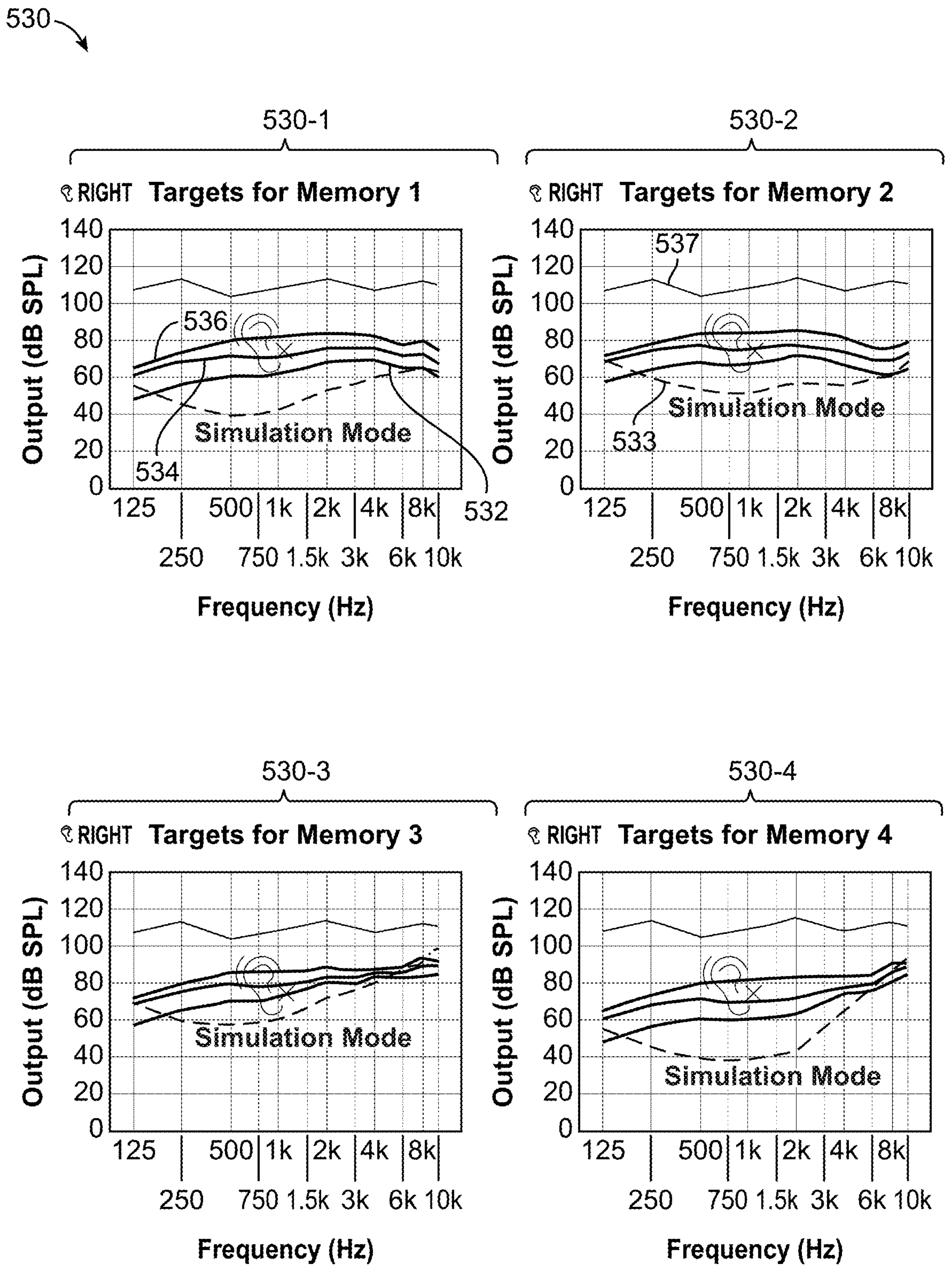
FIG. 5B illustrates a set of graphs depicting example REAR targets corresponding to the audiometric threshold profiles of FIG. 5A, in accordance with some examples.

For example, the configured set of prescriptive targets can correspond to the set of four memory targets 530 illustrated in FIG. 5B (e.g., a first memory target 530-1, a second memory target 530-2, a third memory target 530-3, a fourth memory target 530-4). The set of four memory targets 530 shown in FIG. 5B can correspond to a set of four different exemplar audiograms 510 as illustrated in FIG. 5A. For example, a first exemplar audiogram 510-1 can correspond to the first memory target 530-1, a second exemplar audiogram 510-2 can correspond to the second memory target 530-2, a third exemplar audiogram 510-3 can correspond to the third memory target 530-3, and a fourth exemplar audiogram 510-4 can correspond to the fourth memory target 530-4.

Figure 5C:
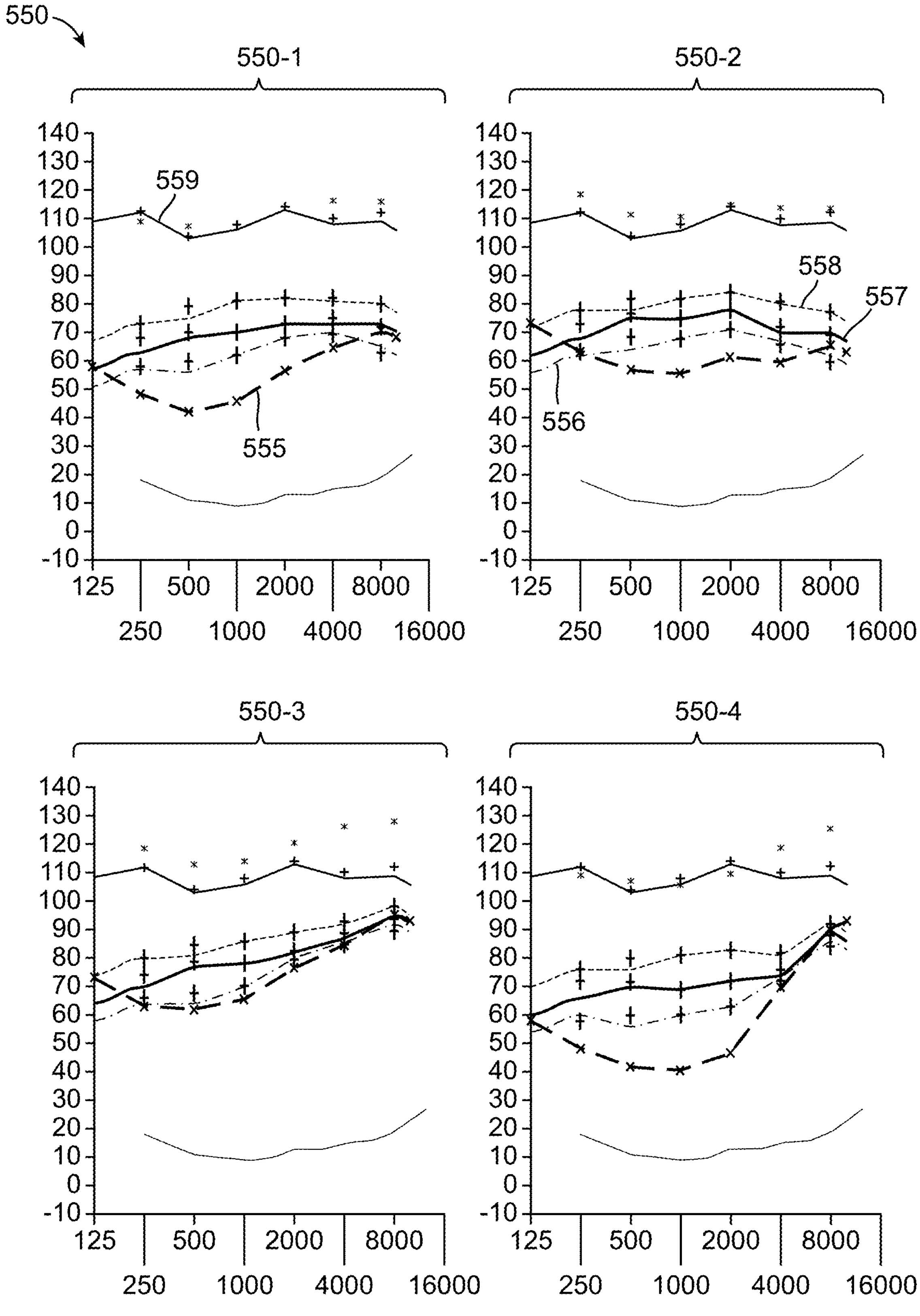
FIG. 5C illustrates a set of graphs depicting REHRs corresponding to the REAR targets of FIG. 5B for each of the audiometric threshold profiles of FIG. 5A, in accordance with some examples.

In each memory, the calibration settings, gain, and compression required to reach the appropriate fitting targets in the real ear are programmed into the Comparator processor. In some embodiments, these extra calibration steps are used to produce an appropriate and highly accurate acoustic output under headphones (e.g., REHR) that simulates the REAR of an acoustic hearing aid device and that simulates the response of a contact hearing device (e.g., contact hearing device 150) placed against the listener's eardrum. For example, FIG. 5C illustrates a set of four REHR measurements 550 that depict respective measurements obtained for each of the four memory targets of FIG. 5B. In particular, a first set of REHR measurements 550-1 can correspond to the first memory target 530-1 (and the first audiogram 510-1); a second set of REHR measurements 550-2 can correspond to the second memory target 530-2 (and the second audiogram 510-2); a third set of REHR measurements 550-3 can correspond to the third memory target 530-3 (and the third audiogram 510-3); and a fourth set of REHR measurements 550-4 can correspond to the fourth memory target 530-4 (and the fourth audiogram 510-4).

In one illustrative example, once output calibration is established as described above, the probe microphone can be placed in the listener's ear canal under the headphones, and fitting algorithms can be used to set the gain and compression settings for the four different exemplar audiograms 510-1, 510-2, 510-3, 510-4 depicted in FIG. 5A to the configured set of prescriptive targets (e.g., the memory targets 530-1, 530-2, 530-3, 530-4 of FIG. 5B, respectively). More particularly, FIG. 5A illustrates a plurality of graphs depicting audiometric threshold profiles 510, FIG. 5B illustrates a plurality of graphs depicting CAM2HF REAR targets 530 corresponding to each audiometric threshold profile of FIG. 5A, and FIG. 5C illustrates a plurality of graphs depicting REHRs 550 corresponding to the comparator memories of FIG. 5B for each of the audiometric threshold profiles of FIG. 5A, in accordance with some examples.

The four audiograms 510-1, 510-2, 510-3, and 510-4 of FIG. 5A can correspond to a Comparator Audiogram 1, 2, 3, and 4 (respectively). Within each of the exemplar audiograms 510-1-510-4, FIG. 5A depicts the respective Comparator audiometric threshold values in dB HL units as a function of frequency, shown as the series of open circles connected along a solid line 512. The Comparator audiometric threshold profiles of the audiograms 510-1-510-4 are used to generate fitting targets for the configured set of prescriptive targets mentioned above. The contact hearing device fitting range is overlaid on the graphs of FIG. 5A as a respective shaded region 515 within each of the four different exemplar audiograms 510-1, 510-2, 510-3, and 510-4.

FIG. 5B depicts four different REAR targets 530-1, 530-2, 530-3, and 530-4 corresponding to the four different exemplar audiograms 510-1, 510-2, 510-3, and 510-4 (respectively). For example, the set of REAR targets 530 includes Targets for Memory 1, 2, 3, and 4, respectively corresponding to exemplar audiograms 1, 2, 3 and 4.

Each REAR target 530-1, 530-2, 530-3, 530-4 can, in some embodiments, comprise CAM2HF REAR targets depicted as the three solid lines 532, 534, 536 within each of the four graphs of FIG. 5B. In particular, each graph of REAR targets (e.g., 530-1, 530-2, 530-3, 530-4) can include a first (e.g., bottom) REAR target 532 for soft speech, a second (e.g., middle) REAR target 534 for average speech, and a third (e.g., top) REAR target 536 for loud speech. The soft, average, and loud speech REAR targets 532-536 of each REAR graph 530-1-530-4 correspond to the respective audiogram 510-1-510-4. The uppermost, solid line curve 537 represents MPO thresholds, while the bottommost, dashed line curve 533 represents the audiometric threshold in dB SPL.

FIG. 5C depicts a set of four different graphs 550 obtained from a Real Ear Measurement system showing the Real Ear Headphone Response (REHR) for soft speech-like stimuli (ISTS) (e.g., curve 556); moderate speech-like stimuli (e.g., curve 557); and loud speech-like stimuli (e.g., curve 558). Each graphed set of REHRs 550-1, 550-2, 550-3, 550-4 additionally illustrates a respective maximum output curve (e.g., curve 559) for the corresponding one of the four comparator memories 530-1, 530-2, 530-3, 530-4. Respective audiograms in dB SPL are indicated for each graphed set of REHRs (e.g., 550-1-550-4) by the 'x' markers connected by the curve 555.

When the memory that matches the desired fitting profile is selected in the Comparator processor, the appropriate fitting prescription and calibration will be applied in the processor, and the appropriate output signal will be delivered through the headphones to the ear of the listener. In some embodiments, the clinician's professional judgment may be used to choose the audiometric profile (and corresponding processor memory) that best matches the patient's audiogram. In some embodiments, the Comparator apparatus 200 can be configured to automatically determine, select, or otherwise choose an audiometric profile and corresponding processor memory that best matches a particular patient's audiogram and/or hearing abilities.

The systems and techniques described herein, including the Comparator apparatus 200 of FIGS. 2A and 2B, can be used to quickly provide an accurate live demonstration of an on-ear contact hearing device listening experience to a prospective patient. Advantageously, the Comparator apparatus 200 can additionally be used to quickly provide an accurate live demonstration of the prospective patient's current hearing aid or hearing device, in an intuitive and easy to use side-to-side (i.e., back-to-back) comparison between the on-ear contact hearing device listening experience and the patient's hearing aid listening experience. Notably, the Comparator apparatus 200 can implement the back-to-back comparison in substantially real time and using the same ambient or environmental audio as captured, processed, and perceived by the listener when using either device.

The accuracy of the acoustic side of the Comparator apparatus 200 (e.g., the portion and/or audio processing pipeline(s) of the Comparator apparatus 200 associated with the hearing aid insert coupler 210 of FIGS. 2A-B) makes the Comparator apparatus 200 potentially useful for acoustic hearing device demonstrations even in the absence of candidacy for an on-ear contact hearing device, as the presently disclosed Comparator system is quick, accurate, and more sanitary than demonstrating a physical hearing aid in the patient's ear. The accuracy of the on-ear contact hearing device simulation side (e.g., associated with the contact hearing device insert coupler 250 depicted in FIGS. 2A-B) means that the Comparator is a useful demonstration and screening tool for clinicians to demonstrate candidacy for a contact hearing device system if the patient notices a difference compared to an appropriate acoustic hearing aid, they should notice a difference when fit with a fully custom Lens, Ear Tip, and customized programming for their specific hearing loss. In some embodiments, the Comparator apparatus 200 can also double as a listening stethoscope for the clinician to listen to the specific audio output provided by an existing CHD user's own ear tip and CHD processor, to thereby identify and/or troubleshoot one or more issues that may be observable or otherwise present within the processed audio output for the existing contact hearing device (CHD) user.

Figure 6:
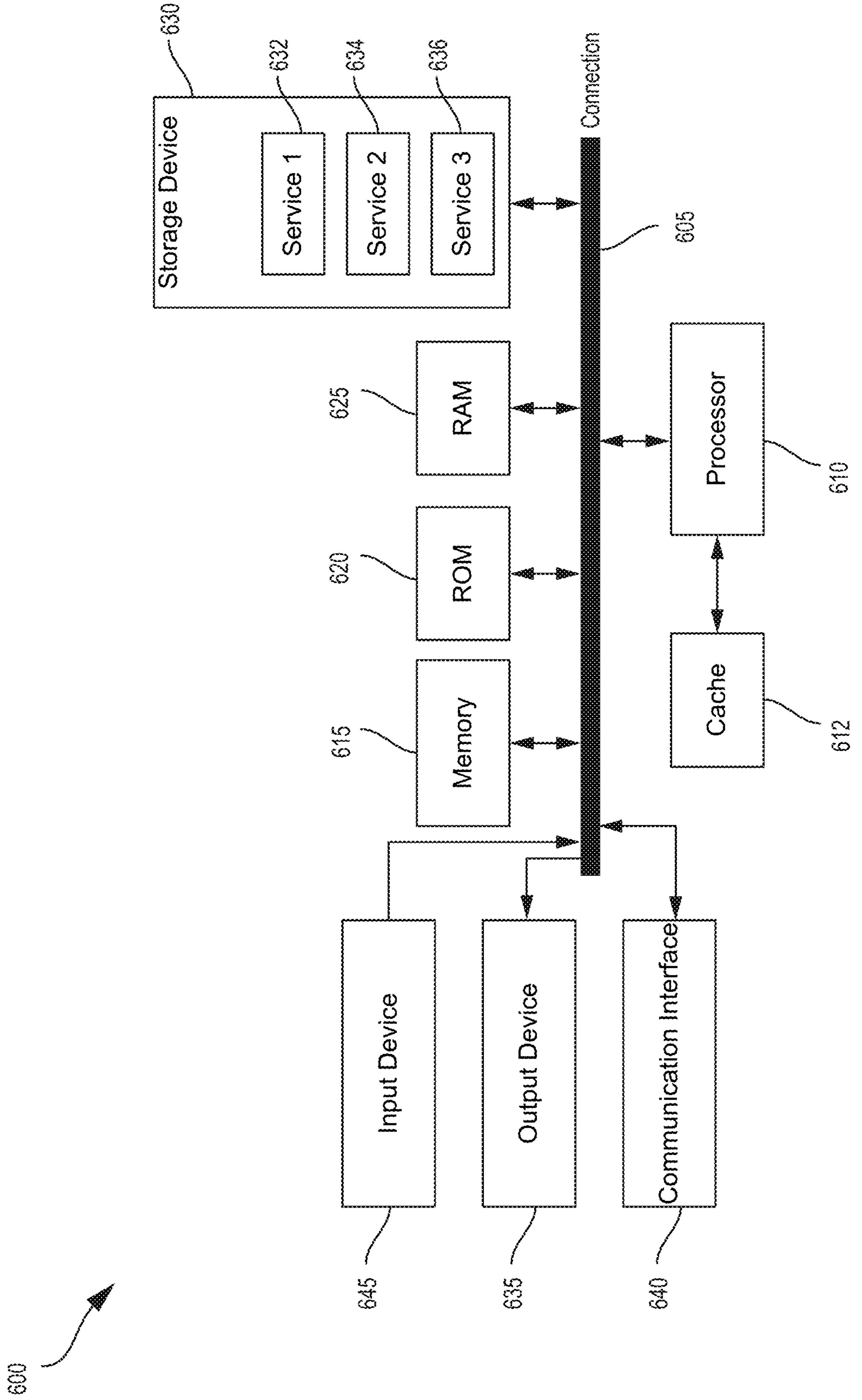
FIG. 6 is a block diagram illustrating an example of a computing system, in accordance with some examples.

FIG. 6 is a diagram illustrating an example of a system for implementing certain aspects of the present technology. In particular, FIG. 6 illustrates an example of computing system 600, which may be for example any computing device making up internal computing system, a remote computing system, a camera, or any component thereof in which the components of the system are in communication with each other using connection 605. Connection 605 may be a physical connection using a bus, or a direct connection into processor 610, such as in a chipset architecture. Connection 605 may also be a virtual connection, networked connection, or logical connection.

In some aspects, computing system 600 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 600 includes at least one processing unit (CPU or processor) 610 and connection 605 that communicatively couples various system components including system memory 615, such as read-only memory (ROM) 620 and random-access memory (RAM) 625 to processor 610. Computing system 600 may include a cache 614 of high-speed memory connected directly with, in close proximity to, or integrated as part of processor 610.

Processor 610 may include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which may represent any number of input mechanisms, such as a microphone for speech, a touch-sensitive screen for gesture or graphical input, keyboard, mouse, motion input, speech, etc. Computing system 600 may also include output device 635, which may be one or more of a number of output mechanisms. In some instances, multimodal systems may enable a user to provide multiple types of input/output to communicate with computing system 600.

Computing system 600 may include communications interface 640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 6G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EE-PROM), flash EPROM (FLASHEPROM), cache memory (e.g., Level 1 (L1) cache, Level 2 (L2) cache, Level 3 (L3) cache, Level 6 (L4) cache, Level 5 (L5) cache, or other (L #) cache), resistive random-access memory (RRAM/Re-RAM), phase change memory (PCM), spin transfer torque RAM (STT-RAM), another memory chip or cartridge, and/or a combination thereof.

The storage device 630 may include software services, servers, services, etc., that when the code that defines such software is executed by the processor 610, it causes the system to perform a function. In some aspects, a hardware service that performs a particular function may include the software component stored in a computer-readable medium in connection with the necessary hardware components, such as processor 610, connection 605, output device 635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general-purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term “processor,” as used herein may refer to any of the foregoing structure, any combination of the foregoing structure, or any other structure or apparatus suitable for implementation of the techniques described herein.

One of ordinary skill will appreciate that the less than (“<”) and greater than (“>”) symbols or terminology used herein may be replaced with less than or equal to (“≤”) and greater than or equal to (“≥”) symbols, respectively, without departing from the scope of this description.

Where components are described as being “configured to” perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” or “communicatively coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, A and B and C, or any duplicate information or data (e.g., A and A, B and B, C and C, A and A and B, and so on), or any other ordering, duplication, or combination of A, B, and C. The language “at least one of” a set and/or “one or more” of a set does not limit the set to the items listed in the set. For example, claim language reciting “at least one of A and B” or “at least one of A or B” may mean A, B, or A and B, and may additionally include items not listed in the set of A and B.

What is claimed is:

1. An apparatus for simulating a hearing experience of one or more hearing devices, the apparatus comprising:
- a first ear simulator coupler comprising a first aperture on an outer surface of a housing of the apparatus, wherein the first ear simulator coupler is configured to receive a first hearing device;
- an acoustic microphone provided within the interior of the housing below the first aperture and configured to capture first audio input data associated with the first ear simulator coupler;
- a second ear simulator coupler comprising a second aperture on the outer surface of the housing, wherein the second ear simulator coupler includes a receive coil configured to obtain a second audio input data corresponding to a transmitted signal from a contact hearing device inserted within the second ear simulator coupler; and
- an audio output port connected by a switch to a selected one of:
  - a first audio processing path corresponding to a simulated hearing experience of the first hearing device; or
  - a second audio processing path corresponding to a simulated hearing experience of the contact hearing device.

2. The apparatus of claim 1, wherein:
- the contact hearing device comprises an ear tip including one or more microphones, an audio processor, and a transmit coil; and
- the receive coil of the second ear simulator coupler receives the transmitted signal from the transmit coil of the ear tip, wherein the ear tip is inserted within the second ear simulator coupler.

3. The apparatus of claim 2, wherein:
- the transmitted signal encodes processed audio generated by the audio processor of the contact hearing device ear tip and using the one or more microphones; and
- the second audio input data comprises a received version of the transmitted signal as received by the receive coil.

4. The apparatus of claim 1, wherein:
- the first hearing device comprises an acoustic hearing aid;
- the first ear simulator coupler is a hearing aid coupler configured to receive the acoustic hearing aid inserted within the first aperture; and
- the hearing aid coupler and the first aperture have resonance characteristics and an acoustic impedance based on an average or a reference human ear.

5. The apparatus of claim 4, wherein the first audio input data includes:
- amplified sound emitted by the acoustic hearing aid inserted within the first aperture, wherein the amplified sound is captured by the acoustic microphone included in the apparatus; and
- direct path sound captured by the acoustic microphone, where the direct path sound is not emitted by the acoustic hearing aid.

6. The apparatus of claim 1, wherein:
- the apparatus further includes headphones coupled to the audio output port and worn by a listener;
- a first position of the switch causes the apparatus to use the audio output port to provide a first simulated audio output signal to the headphones; and
- a second position of the switch causes the apparatus to use the audio output port to provide a second simulated audio output signal to the headphones.

7. The apparatus of claim 6, wherein:
- playback of the first simulated audio output signal by the headphones produces sound at an eardrum of the listener with a level and a frequency response configured to simulate the hearing experience of the first hearing device; and
- playback of the second simulated audio output signal by the headphones produces sound at the eardrum of the listener with a different level and a different frequency response configured to simulate the hearing experience of the contact hearing device.

8. The apparatus of claim 6, wherein the switch is provided on the outer surface of the housing and is moveable between the first position and the second position by the listener to select between the simulated hearing experience of the first hearing device and the simulated hearing experience of the contact hearing device.

9. The apparatus of claim 8, wherein the apparatus is configured to generate the first simulated audio output signal and the second simulated audio output signal in parallel, based on the first hearing device being inserted within the first ear simulator coupler and the contact hearing device being inserted within the second ear simulator coupler.

10. The apparatus of claim 1, wherein the apparatus includes one or more audio processors configured to:

generate a contact hearing device simulated audio output signal, based at least in part on processing the second audio input data using a selected set of gain and compression settings to parameterize the second audio processing path, wherein the selected set of gain and compression settings corresponds to a selection from a plurality of pre-configured fitting targets for the contact hearing device; and provide the contact hearing device simulated audio output signal to a listener via headphones associated with the apparatus.

11. The apparatus of claim 10, wherein the plurality of pre-configured fitting targets are based on Real Ear Aided Response (REAR) information measured at an eardrum of a reference listener to match a response corresponding to placement of a contact hearing device transducer on the eardrum of the reference listener.

12. The apparatus of claim 10, wherein the contact hearing device simulated audio output signal is provided to the headphones based on a second position of the switch, wherein the second position of the switch couples the audio output port to an output of the second audio processing path.

13. The apparatus of claim 10, wherein:

the contact hearing device simulated audio output signal is generated based on calibration information associated with the headphones;

playback of the contact hearing device simulated audio output signal by the headphones produces a Real Ear Headphone Response (REHR) at an eardrum of the listener; and the REHR simulates a Real Ear Aided Response (REAR) corresponding to the transmitted signal being received by a contact hearing device transducer when placed in contact with the eardrum of listener.

14. The apparatus of claim 13, wherein the apparatus provides the simulated hearing experience of the contact hearing device based on:

generating the contact hearing device simulated audio output signal to cause a level and a frequency response of the REHR associated with the playback by the headphones to be the same as a respective level and a respective frequency response of the REAR associated with the contact hearing device transducer when placed in contact with the eardrum of the listener and driven based on the transmitted signal.

15. The apparatus of claim 1, wherein the apparatus includes one or more audio processors configured to:

obtain the first audio input data based on using the acoustic microphone to capture amplified sound emitted by an acoustic hearing aid inserted within the first ear simulator coupler;

generate an acoustic hearing aid simulated audio output signal, based at least in part on processing the first audio input data using the first audio processing path to remove a resonance associated with the first ear simulator coupler; and provide the acoustic hearing aid simulated audio output signal to a listener via headphones associated with the apparatus.

16. The apparatus of claim 15, wherein the acoustic hearing aid simulated audio output signal is provided to the headphones based on a first position of the switch, wherein the first position of the switch couples the audio output port to an output of the first audio processing path.

17. The apparatus of claim 15, wherein the apparatus is configured to remove the resonance associated with the first ear simulator coupler based on using the first audio processing path to apply an anti-coupler resonance curve to the first audio input data.

18. The apparatus of claim 17, wherein the anti-coupler resonance curve comprises an inverse curve determined based on resonance information of the first ear simulator coupler.

19. The apparatus of claim 15, wherein:

the acoustic hearing aid simulated audio output signal is generated based on calibration information associated with the headphones; and playback of the acoustic hearing aid simulated audio output signal by the headphones corresponds to a Real Ear Headphone Response (REHR) at an eardrum of the listener, where the REHR simulates a Real Ear Aided Response (REAR) corresponding to the amplified sound being emitted by the acoustic hearing aid when worn in-ear by the listener.

20. The apparatus of claim 19, wherein the apparatus provides the simulated hearing experience of the first hearing device based on:

generating the acoustic hearing aid simulated audio output signal to cause a level and a frequency response of the REHR associated with the playback by the headphones to be the same as a respective level and a respective frequency response of the REAR associated with the acoustic hearing aid when worn in-ear by the listener.

* * * * *